(12) United States Patent
Chen et al.

(10) Patent No.: US 6,305,872 B1
(45) Date of Patent: Oct. 23, 2001

(54) BUTTON FOR FRONT PANEL OF A PERSONAL COMPUTER

(75) Inventors: Ching-Chiang Chen; Hsiu-Hsuen Huang; Cheng-Hsuen Chien, all of Taipei (TW)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/384,051

(22) Filed: Aug. 27, 1999

(51) Int. Cl.⁷ ..................................................... F16B 12/36
(52) U.S. Cl. ........................... 403/297; 403/326; 403/329
(58) Field of Search ..................... 403/326, 329, 403/297

(56) References Cited

U.S. PATENT DOCUMENTS

| | | | |
|---|---|---|---|
| 5,593,220 | * | 1/1997 | Seid et al. ............................. 403/326 |
| 5,862,024 | * | 1/1999 | Watanabe ............................. 403/297 |
| 5,992,953 | * | 11/1999 | Rabinovitz ............................ 403/329 |
| 6,053,651 | * | 4/2000 | Tokuwa et al. ....................... 403/329 |
| 6,155,741 | * | 12/2000 | Took ..................................... 403/329 |
| 6,179,511 | * | 1/2001 | Gassler ................................. 403/329 |

\* cited by examiner

*Primary Examiner*—B. Dayoan
*Assistant Examiner*—Aaron M Dunwoody
(74) *Attorney, Agent, or Firm*—Rosenberg, Klein & Lee

(57) ABSTRACT

A button for front panel of a personal computer comprises a pair of tabs provided on a side of an opening of front panel, one of tabs having an aperture, and a groove provided on a side of button having a latched member therein. By utilizing this, an easy engagement and disengagement of button and front panel is carried out.

1 Claim, 8 Drawing Sheets

BUTTON FOR FRONT PANEL OF A PERSONAL COMPUTER

BACKGROUND OF THE INVENTION

1. Field of the Invention

The present invention relates to a button for front panel of a personal computer.

2. Description of Related Art

A conventional button for front panel of a personal computer is shown in FIGS. 1–2 wherein a hole A2 is provided on a side of opening A1 of a front panel A and a hole B1 is provided on a side of a button B. Align hole B1 of button B with opening A1 of front panel A and then thread a bolt C thereinto for securing button B to front panel A.

But this is unsatisfactory for the following reasons:
1) The joins of bolt C with button B and front panel A are susceptible to breakage after a long use due to a concentration of stress.
2) Button B is susceptible to crack due to a sudden concentration of stress when an applied thread force exceeds the maximum load of button B.
3) Thread of bolt C is susceptible to crack due to a concentration of stress when an applied thread force exceeds the maximum torque of bolt C.
4) The employment of bolt C increases the manufacturing cost.

Thus, it is desirable to provide a new button for front panel of a personal computer in order to overcome the above drawbacks of prior art.

SUMMARY OF THE INVENTION

It is an object of the present invention to provide a button for front panel of a personal computer comprising a pair of tabs provided on a side of an opening of front panel, one of tabs having an aperture, and a groove provided on a side of button having a latched member therein. By utilizing this, an easy engagement and disengagement of button and front panel is carried out.

It is another object of the present invention to provide a button for front panel of a personal computer for eliminating the stress concentration occurred in the bolt engagement as implemented by the prior art.

It is still another object of the present invention to provide a button for front panel of a personal computer for decreasing the cost of manufacturing.

The above and other objects, features and advantages of the present invention will become apparent from the following detailed description taken with the accompanying drawings.

DETAILED DESCRIPTION OF THE PREFERRED EMBODIMENTS

Figure 1:
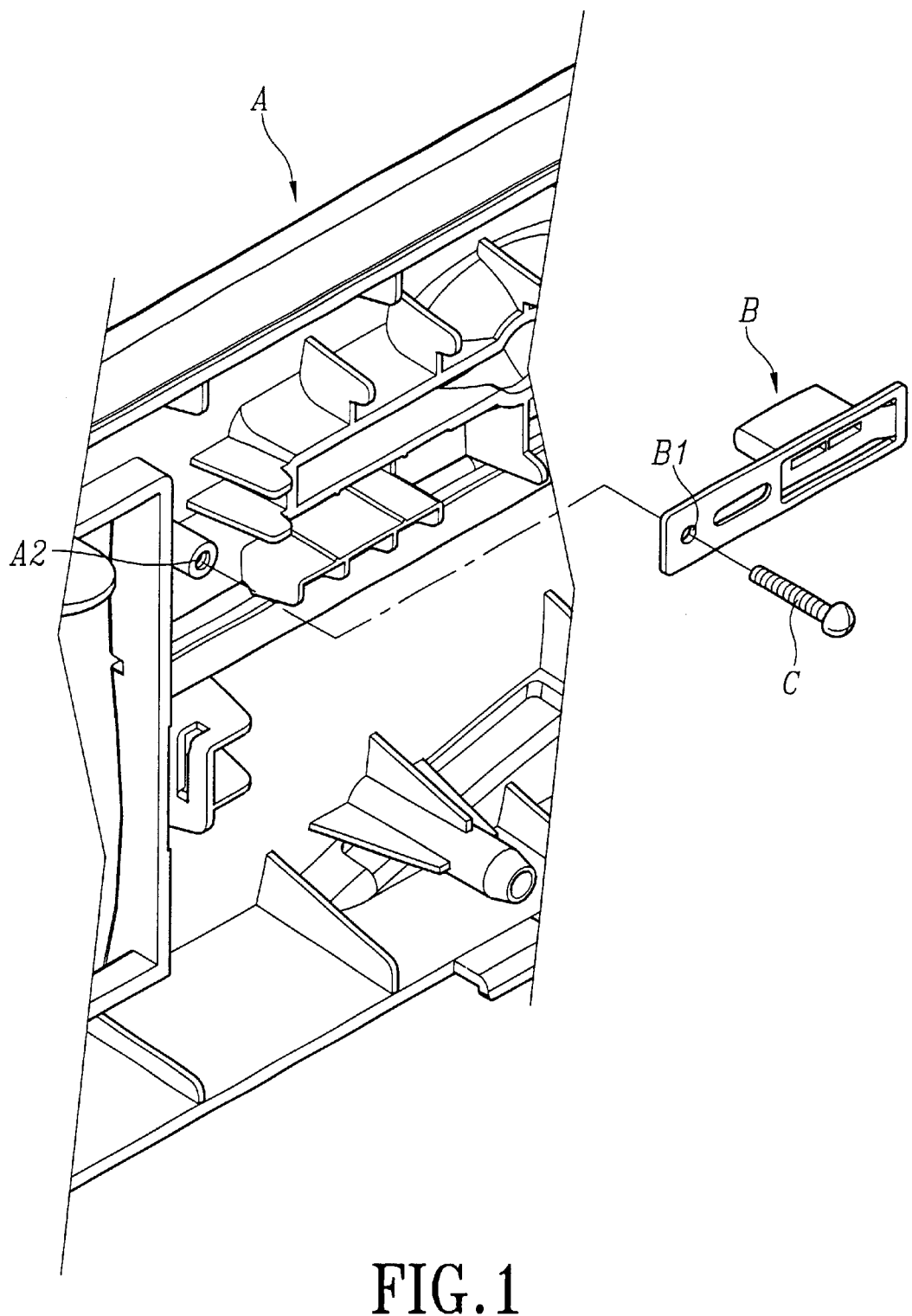
FIG. 1 is an exploded perspective view illustrating an engagement of button and front panel of a prior art.
Figure 2:
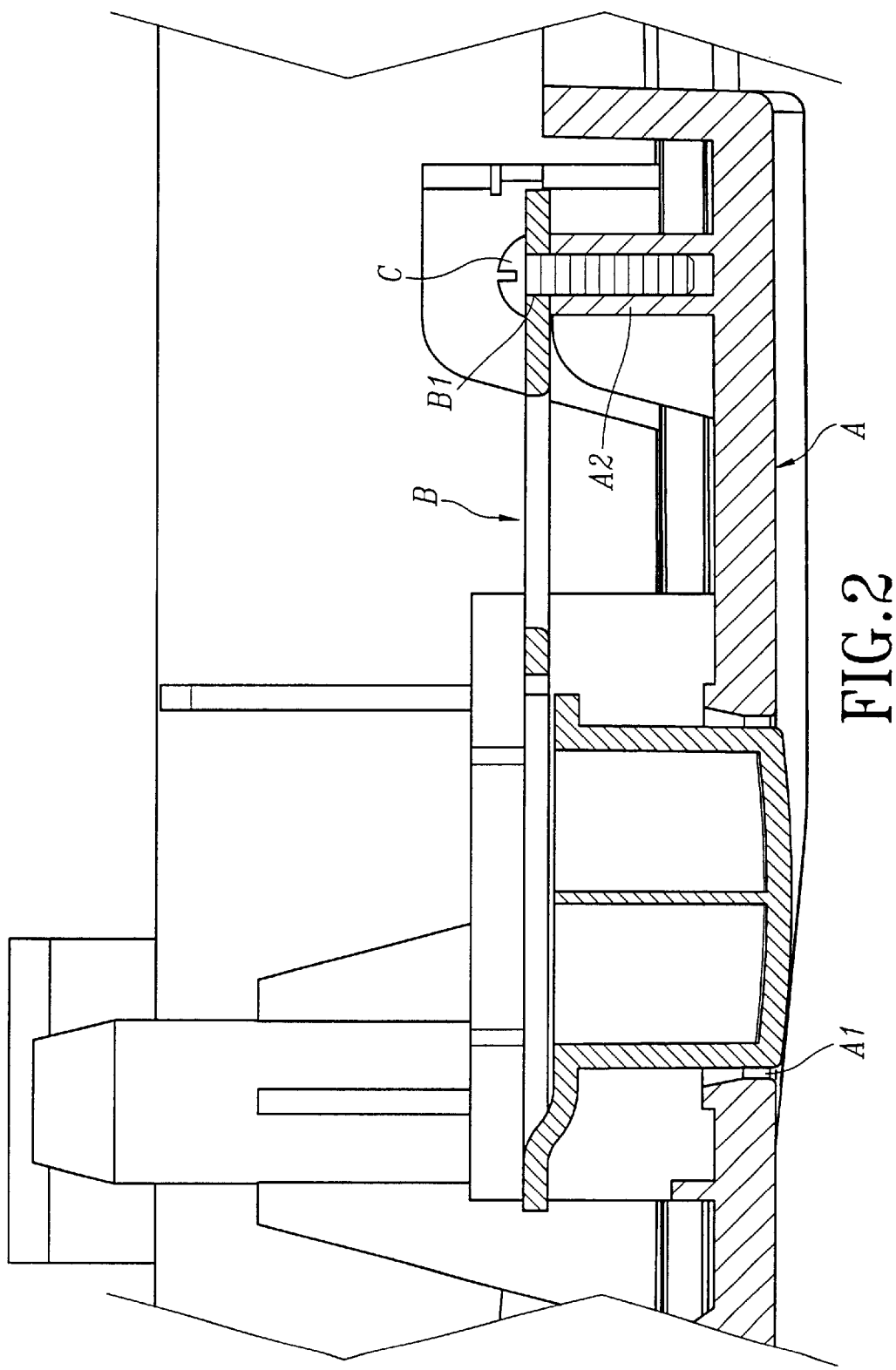
FIG. 2 is a sectional view of FIG. 1.
Figure 3:
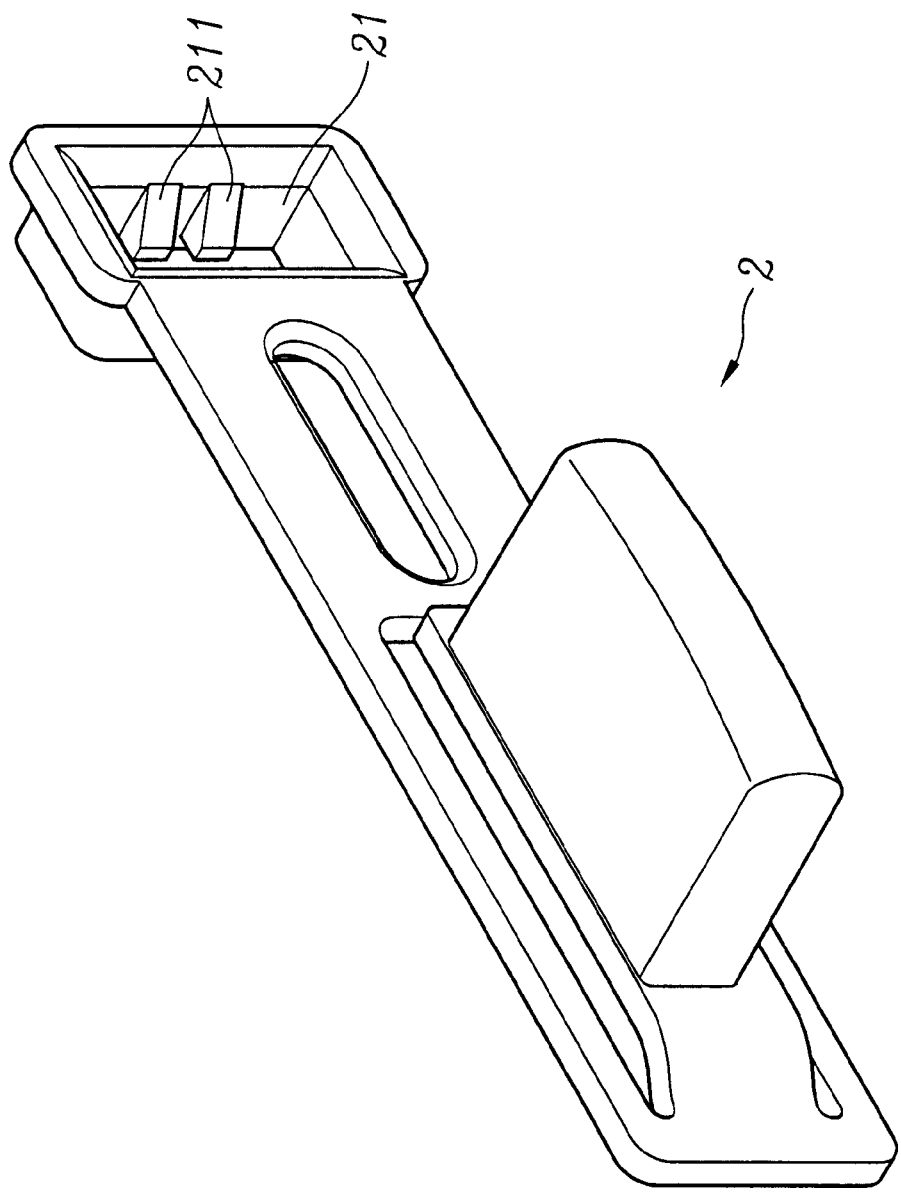
FIG. 3 is a perspective view of the present invention.
Figure 4:
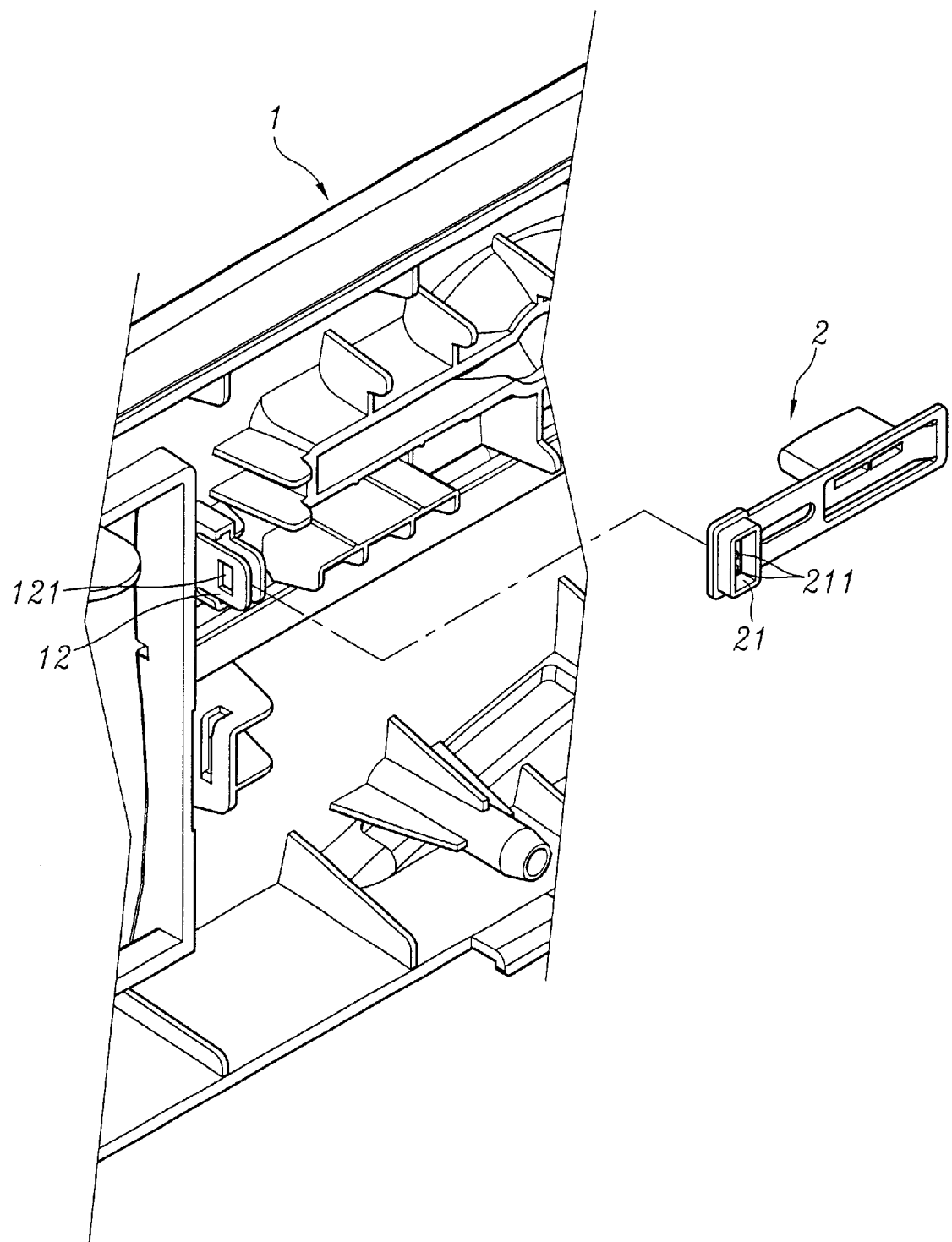
FIG. 4 is an exploded perspective view illustrating an engagement of button and front panel of the present invention.
Figure 5:
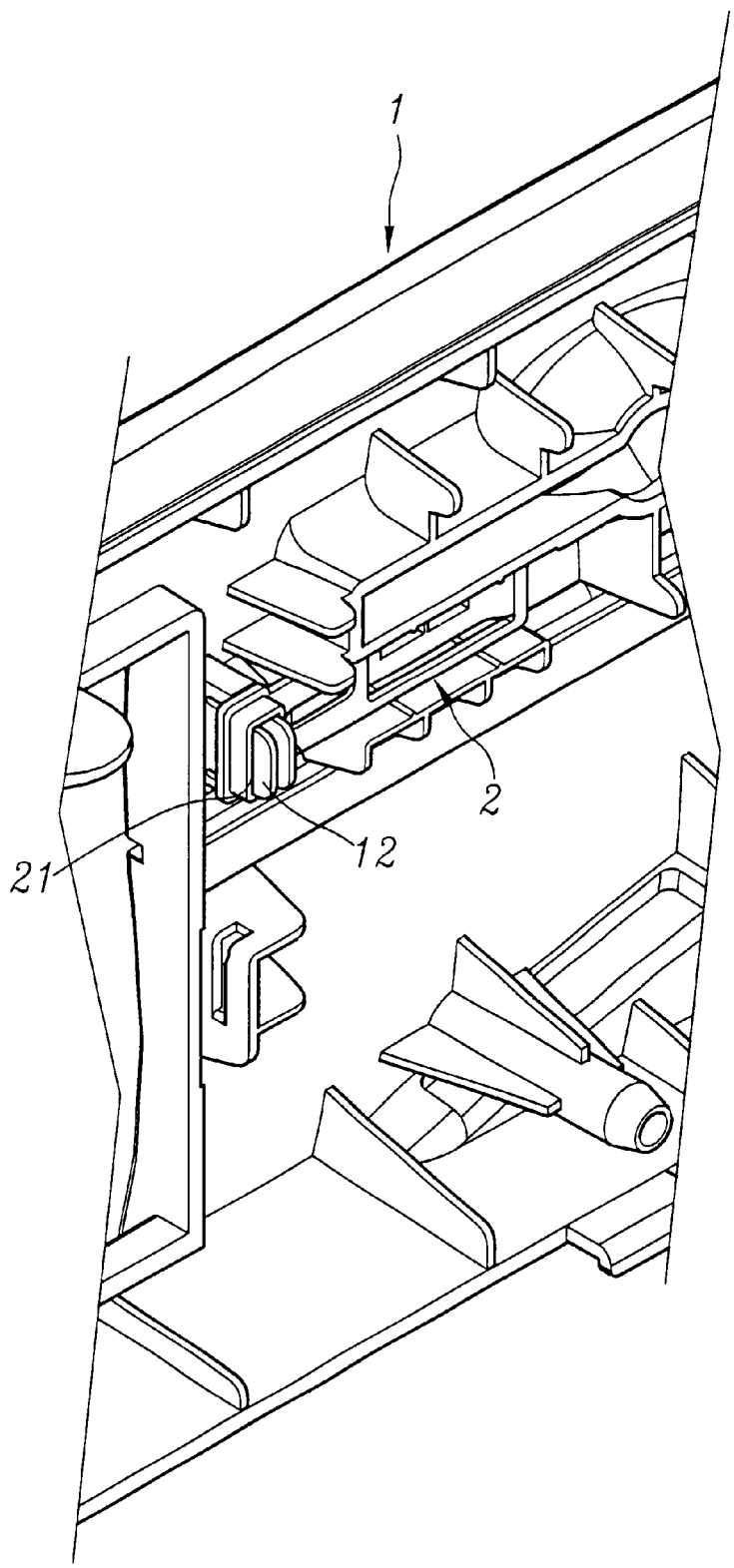
FIG. 5 is a perspective view of FIG. 4.
Figure 6:
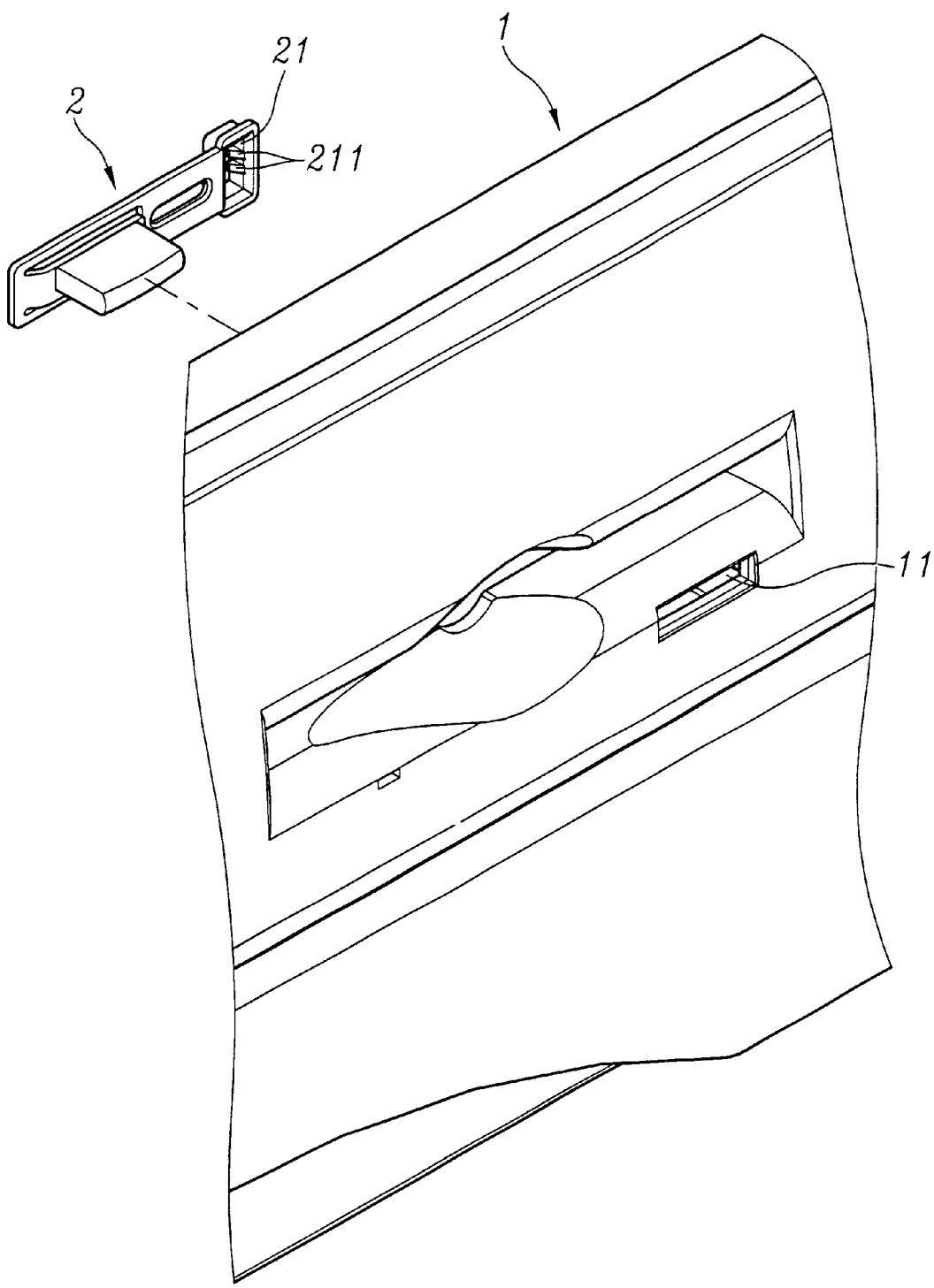
FIG. 6 schematically illustrating the engagement of button and front panel.

Referring to FIGS. 3–6, there is shown a button 2 for front panel 1 of a personal computer of the present invention. A pair of tabs 12 are provided on a side of an opening 11 of front panel 1 wherein one of tabs 12 has an aperture 121. A groove 21 is provided on a side of button 2 having a latched member 211 therein.

Figure 7:
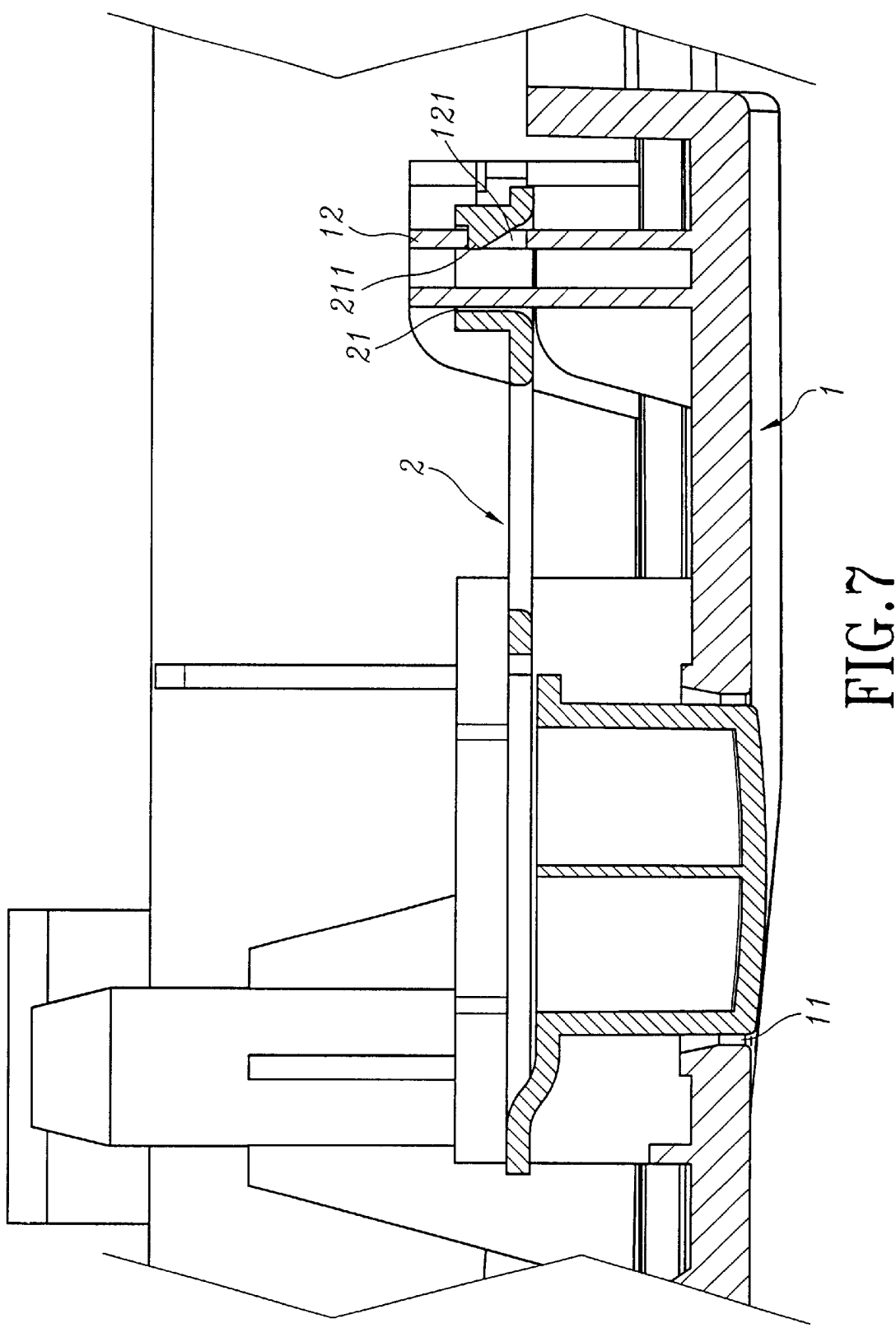
FIG. 7 is a sectional view illustrating the engagement of button and front panel.

Referring to FIG. 7 for illustrating the assembly process, align the groove 21 with tabs 12 such that latched member 211 moves into aperture 121, thereby enabling button 2 to engage with front panel 1.

Figure 8:
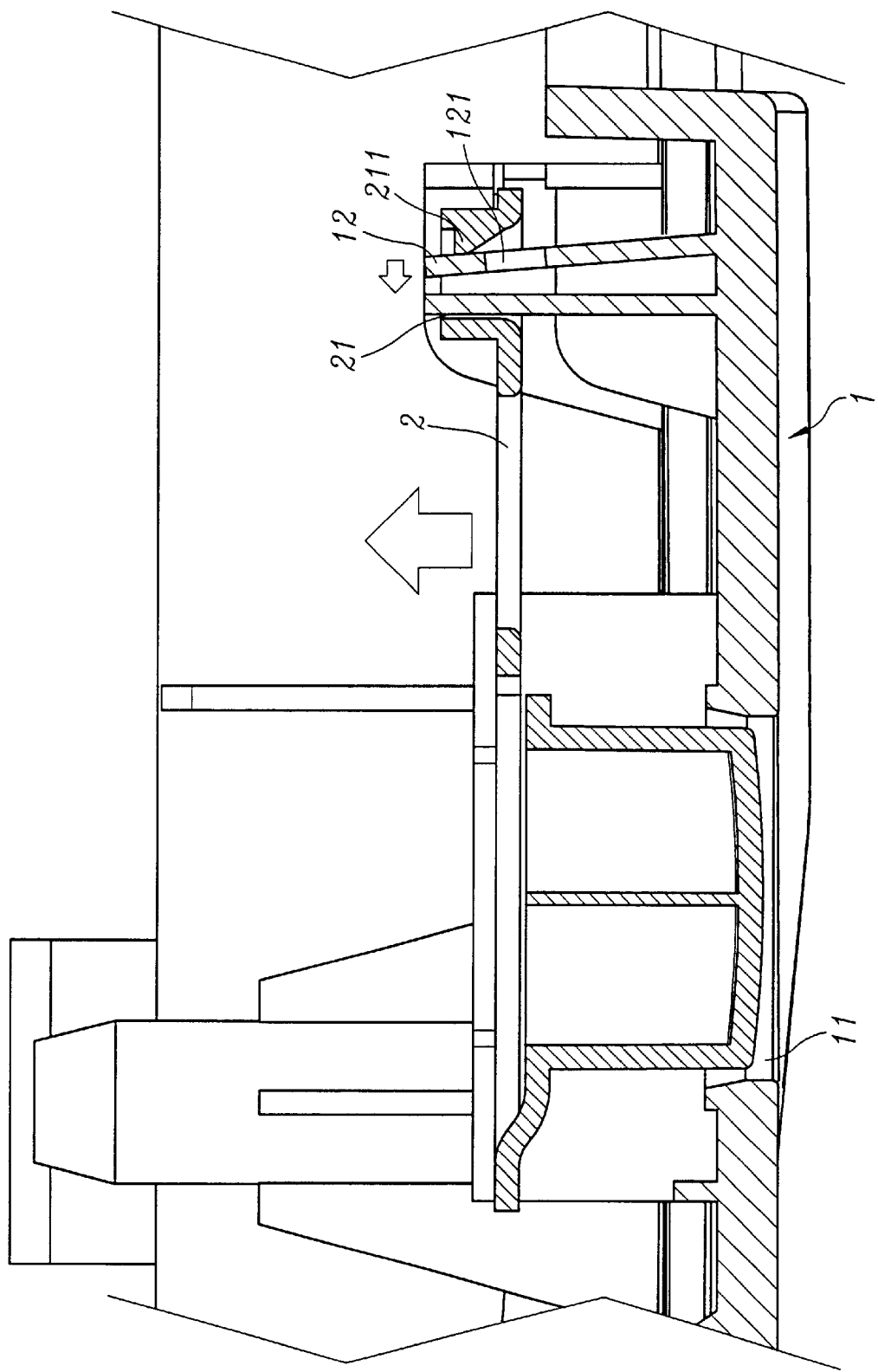
FIG. 8 is a sectional view illustrating the disengagement of button and front panel.

Referring to FIG. 8 for illustrating the disassembly process, push tabs 12 to each other to clear latched member 211 from aperture 121, thereby disengaging button 2 from front panel 1.

ADVANTAGES OVER PRIOR ART

1) The joins of button 2 and front panel 1 is not susceptible to breakage after a long use due to there is no concentration of stress.

2) The invention is not susceptible to crack due to there is no concentration of stress caused by the snapping mechanism.

3) No thread crack due to no bolt employed.

4) A decrease of manufacturing cost is realized due to no bolt employed.

While the invention herein disclosed has been described by means of specific embodiments, numerous modifications and variations could be made thereto by those skilled in the art without departing from the scope of the invention set forth in the claims.

What is claimed is:

1. A combined button and front panel of a personal computer, said combination comprising:

a pair of tabs extending from an internal surface of said front panel and integrally formed therewith, said pair of tabs being located in close proximity to a respective side of a button receiving opening formed through said front panel, one of said pair of tabs having an aperture formed therein; and said button including a locking portion formed therein, said locking portion having a groove formed therein in aligned relationship with said tabs of the front panel, said groove having a side wall and a latching member extending from said side wall of said groove in corresponding relationship with said aperture in said one tab, wherein said tabs of the front panel are engaged within said groove of said locking portion of said button, and said latching member of said button is releasably engaged within said aperture of said one tab of the front panel to thereby secure said button within said button receiving opening of said front panel.

* * * * *

UNITED STATES PATENT AND TRADEMARK OFFICE
CERTIFICATE OF CORRECTION

PATENT NO.  : 6,305,872 B1
DATED       : October 23, 2001
INVENTOR(S) : Ching-Chiang Chen, Hsiu-Mei Huang and Cheng-Hsuen Chien It is certified that error appears in the above-identified patent and that said Letters Patent is hereby corrected as shown below:

<u>Title page,</u>
Item [75], delete the second inventor name "Hsiu-Hsuen Huang" and insert therefor
-- Hsiu-Mei Huang --

Signed and Sealed this

Seventh Day of May, 2002

*Attest:*

*Attesting Officer*

JAMES E. ROGAN
*Director of the United States Patent and Trademark Office*